United States Patent
Ro et al.

(10) Patent No.: US 9,661,485 B2
(45) Date of Patent: May 23, 2017

(54) METHOD AND APPARATUS FOR INDICATING DISCOVERY SIGNAL RESOURCES IN DEVICE-TO-DEVICE WIRELESS COMMUNICATIONS

(71) Applicant: Samsung Electronics Co., Ltd., Gyeonggi-do (KR)

(72) Inventors: Sangmin Ro, Seoul (KR); Yongjun Kwak, Gyeonggi-do (KR); Younsun Kim, Gyeonggi-do (KR); Hyoungju Ji, Seoul (KR)

(73) Assignee: Samsung Electronics Co., Ltd (KR)

( * ) Notice: Subject to any disclaimer, the term of this patent is extended or adjusted under 35 U.S.C. 154(b) by 47 days.

(21) Appl. No.: 14/263,538

(22) Filed: Apr. 28, 2014

(65) Prior Publication Data
US 2014/0323126 A1  Oct. 30, 2014

(30) Foreign Application Priority Data

Apr. 26, 2013 (KR) .................. 10-2013-0046736

(51) Int. Cl.
*H04W 8/00* (2009.01)
*H04W 76/02* (2009.01)
(Continued)

(52) U.S. Cl.
CPC ......... *H04W 8/005* (2013.01); *H04L 27/2655* (2013.01); *H04W 48/12* (2013.01); *H04W 56/002* (2013.01); *H04W 76/023* (2013.01)

(58) Field of Classification Search
CPC . H04W 48/12; H04W 56/002; H04W 76/023; H04W 72/00; H04W 56/00; H04W 8/00
See application file for complete search history.

(56) References Cited

U.S. PATENT DOCUMENTS

2007/0274270 A1* 11/2007 Jones ............... H04W 84/18
370/338
2012/0093098 A1  4/2012 Charbit et al.
(Continued)

FOREIGN PATENT DOCUMENTS

EP  2 725 856  4/2014
EP  2 736 298  5/2014
(Continued)

OTHER PUBLICATIONS

NTT DOCOMO, "Views on Enhanced Small Cell Discovery", R1-131425, 3GPP TSG RAN WG1 Meeting #72bis, Apr. 15-19, 2013, 9 pages.
(Continued)

*Primary Examiner* — Kashif Siddiqui
*Assistant Examiner* — Minjung Kim
(74) *Attorney, Agent, or Firm* — The Farrell Law Firm, P.C.

(57) ABSTRACT

Methods and apparatuses are provided for indicating a discovery signal resource by a User Equipment (UE) performing device-to-device communication. The UE receives information relating to the device-to-device communication from a base station. A synchronization signal including discovery signal-related information, is transmitted from the UE to a nearby UE, based on the information relating to the device-to-device communication. A discovery is performed based on the discovery signal-related information.

23 Claims, 6 Drawing Sheets

(51) Int. Cl.
    *H04W 56/00*     (2009.01)
    *H04L 27/26*     (2006.01)
    *H04W 48/12*     (2009.01)

(56) References Cited

U.S. PATENT DOCUMENTS

| | | | |
|---|---|---|---|
| 2013/0029712 A1 | 1/2013 | Shao et al. | |
| 2013/0157656 A1* | 6/2013 | Gao | H04W 76/023 |
| | | | 455/434 |
| 2014/0003262 A1* | 1/2014 | He | H04W 28/08 |
| | | | 370/252 |
| 2014/0057670 A1* | 2/2014 | Lim | H04W 8/005 |
| | | | 455/509 |
| 2014/0120934 A1 | 5/2014 | Kishiyama | |
| 2014/0126417 A1 | 5/2014 | Kang et al. | |
| 2014/0321452 A1 | 10/2014 | Choi et al. | |

FOREIGN PATENT DOCUMENTS

| | | |
|---|---|---|
| WO | WO 2013/002206 | 1/2013 |
| WO | WO 2013/012222 | 1/2013 |
| WO | WO 2013/015623 | 1/2013 |
| WO | WO 2013/025057 | 2/2013 |
| WO | WO 2013/081393 | 6/2013 |

OTHER PUBLICATIONS

European Search Report dated Nov. 17, 2016 issued in counterpart application No. 14788359.9-1854, 10 pages.

\* cited by examiner

METHOD AND APPARATUS FOR INDICATING DISCOVERY SIGNAL RESOURCES IN DEVICE-TO-DEVICE WIRELESS COMMUNICATIONS

PRIORITY

This application claims priority under 35 U.S.C. §119(a) to Korean Patent Application No. 10-2013-0046736, filed on Apr. 26, 2013 in the Korean Intellectual Property Office, the content of which is incorporated herein by reference.

BACKGROUND OF THE INVENTION

1. Field of the Invention

The present invention relates generally to resource discovery in wireless communication, and more particularly, to a method and an apparatus for signal design for efficiently indicating discovery of signal resources to a device in wireless communication.

2. Description of the Related Art

The $3^{rd}$ Generation Partnership Project (3GPP), which is the standards group for asynchronous cellular mobile communication, has studied Device-to-Device (D2D) communication between devices using Long Term Evolution (LTE) system standards, as well as the conventional wireless communication between a base station and a User Equipment (UE). An important requirement for D2D communication is to enable D2D communication, not only in a situation capable of receiving a conventional cellular system service, but also in a situation incapable of receiving the cellular system service. For example, in a situation in which a base station cannot operate, i.e., cannot provide a cellular service, due to, for example, a natural disaster, an emergency communication between users through D2D communication is required.

A D2D communication process inevitably includes a discovery operation in which one UE discovers surrounding UEs. To this end, each UE supporting D2D transmits a discovery signal to surrounding UEs to enable the surrounding UEs to recognize its existence. The UE then receives discovery signals transmitted from the surrounding UEs to recognize the existence of the surrounding UEs.

Each UE can efficiently perform discovery signal transmission and reception only when it has acquired an identical time reference, i.e., commonly applicable time synchronization, and when it knows configuration information relating to discovery signal transmission/reception resources. For example, when synchronization between UEs is acquired, UEs performing D2D communication may transmit or receive a discovery signal only at a particular time resource based on a common time to minimize the electric power consumption for monitoring of a discovery signal from another UE.

If synchronization between UEs is not acquired, respective UEs transmit their own discovery signals at different time points. The respective UEs should always monitor discovery signals from other UEs in order to receive the discovery signals, which increases the power consumption of each UE.

As described above, a discovery process is an indispensable operation in D2D communication, and synchronization between UEs should be established in order to efficiently perform the discovery process. In general, UEs can establish synchronization by acquiring a common time reference from a base station or a network. However, in an emergency situation, if a base station or network is unable to provide a cellular service, there is no other device available for acquiring synchronization between UEs.

In order to solve this problem, a method has been studied of providing a D2D synchronization signal to UEs within an area unable to provide cellular service, by a UE currently belonging to a normal base station adjacent to the area. However, not only the D2D synchronization signal, but also discovery signal resource configuration information should be shared between UEs in the area unable to provide cellular service in order to achieve a smooth discovery operation. To this end, use of an additional D2D communication resource to transmit discovery signal configuration information by a UE belonging to a normal base station is not preferable in view of resource consumption and an increase of limitation in use of existing cellular UE communication resources.

SUMMARY OF THE INVENTION

The present invention has been made to address at least the above problems and/or disadvantages and to provide at least the advantages described below. Accordingly, an aspect of the present invention provides a signal design method, an indication method, an operation process, and an apparatus for the same, in order to efficiently indicate discovery signal resource configuration.

According to an aspect of the present invention, a method is provided for indicating a discovery signal resource by a UE performing device-to-device communication. The UE receives information relating to the device-to-device communication from a base station. A synchronization signal including discovery signal-related information, is transmitted from the UE to a nearby UE, based on the information relating to the device-to-device communication. A discovery is performed based on the discovery signal-related information.

According to another aspect of the present invention, a method is provided for indicating a discovery signal resource by a UE performing device-to-device communication. The UE receives discovery signal-related information from a nearby UE. The UE performs a discovery based on the discovery signal-related information.

According to an additional aspect of the present invention, a method is provided for indicating a discovery signal resource for a UE performing device-to-device communication by a base station. The base station receives a device-to-device communication service request from the UE. Information relating to the device-to-device communication, is transmitted from the base station to the UE. The information relating to the device-to-device communication includes at least one of information on a communication resource allocated for the device-to-device communication, information on a discovery signal, information on whether the UE should transmit a synchronization signal, and resource configuration information of the synchronization signal.

According to a further aspect of the present invention, a UE is provided for performing device-to-device communication. The UE includes a communication unit that performs data communication with at least one of a base station and a nearby UE. The UE also includes a controller that controls the communication unit to receive information relating to the device-to-device communication from the base station and transmit a synchronization signal including discovery signal-related information to the nearby UE based on the information relating to the device-to-device communication, and that performs a discovery based on the discovery signal-related information.

According to another aspect of the present invention, a UE is provided for performing device-to-device communication. The UE includes a communication unit that performs data communication with a nearby UE. The UE also includes a controller that controls the communication unit to receive discovery signal-related information from the nearby UE, and perform a discovery based on the discovery signal-related information.

According to another aspect of the present invention, a base station supporting a resource of a UE is provided for performing device-to-device communication. The base station includes a communication unit that performs data communication with the UE. The base station also includes a controller that controls the communication unit to receive a device-to-device communication service request from the UE and transmit information relating to the device-to-device communication to the UE. The information relating to the device-to-device communication includes at least one of information on a communication resource allocated for the device-to-device communication, information on a discovery signal, information on whether the UE should transmit a synchronization signal, and resource configuration information of the synchronization signal.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE PRESENT INVENTION

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention. Terms described herein are defined in consideration of functions of embodiments of the present invention, but may vary according to the intention or convention of a user or operator. Therefore, the definitions of the terms should be determined based on the contents throughout the specification.

A method and an apparatus are provided for designing a D2D synchronization signal in order to efficiently support provision of discovery signal resource configuration information through the D2D synchronization signal, according to embodiments of the present invention.

Figure 1:
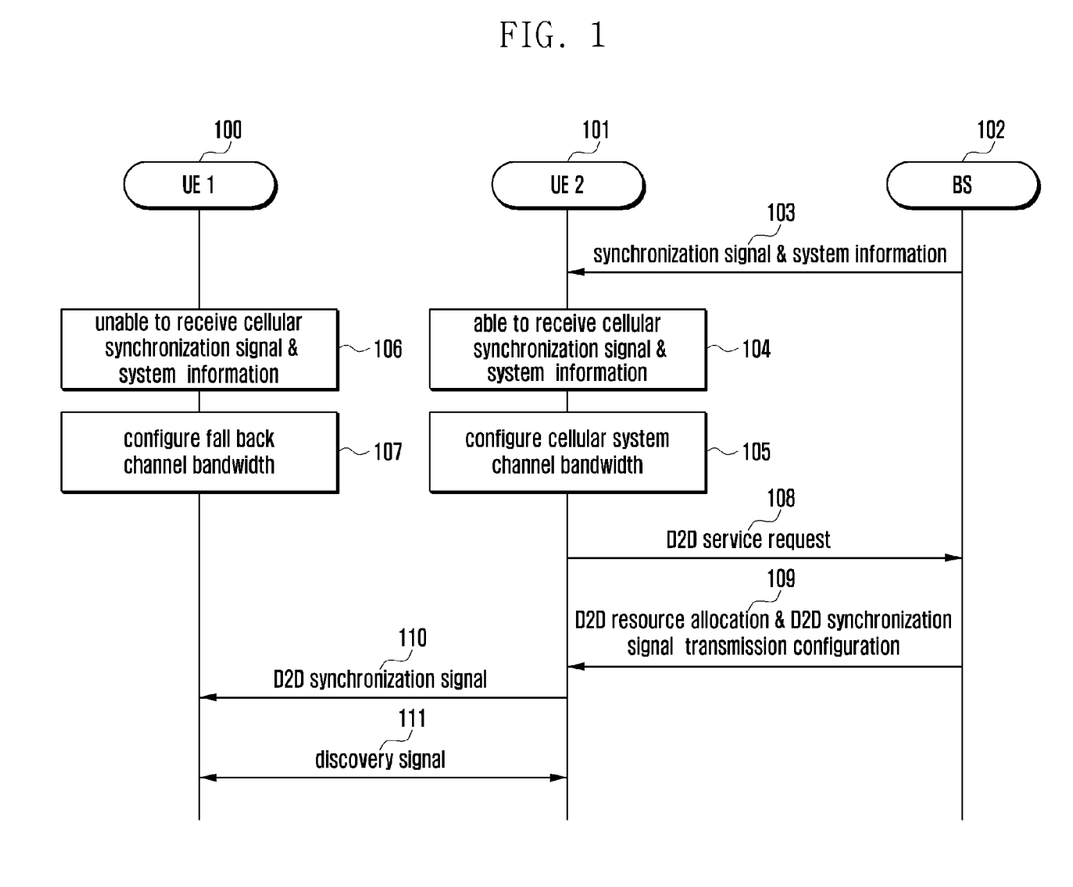
FIG. 1 is a signal flow diagram illustrating transmission and reception of D2D related signals between UEs and base stations in a wireless communication system, according to an embodiment of the present invention.

FIG. 1 is a signal flow diagram illustrating transmission and reception of D2D related signals between UEs and base stations in a wireless communication system, according to an embodiment of the present invention.

Referring to FIG. 1, it is assumed that a UE 1 100 is located outside of a service area of a Base Station (BS) 102, and that a UE 2 101 is located within the service area of the Base Station (BS) 102. Further, it is assumed that the UE 1 100 is currently unable to receive a cellular service due to damage to a BS caused by, for example, a natural disaster, within the area in which it is located, and the UE 2 101 is located at a boundary area of the service area of the BS 102. The BS 102 can identify UEs located adjacent to the boundary area, like the UE 2 101, among UEs within the service area of the BS 102, from the channel status reports or sounding reference signals received from the UEs within the service area of the BS 102 or through an electric power control process for the UEs. Further, the BS 102 can detect through a cellular network that an area at a location adjacent to its own service area no longer provides cellular service due to damage to an adjacent base station caused by, for example, a natural disaster. Therefore, the BS 102 may determine that the UE 2 101 may perform D2D communication with a UE located within the area no longer providing cellular service, such as the UE 1 100.

The BS 102 transmits system information and a synchronization signal for a cellular service to UEs within its own service area, in step 103. The UE 2 101 is located within the service area of the BS 102 and is able to receive the system information and the synchronization signal, in step 104. Further, the UE 2 101 can obtain information on the cellular channel bandwidth configuration to be used by the UE 2 101 from the system information, in step 105. In contrast, the UE 1 100 is located outside of the service area of the BS 102 and is unable to receive the system information and the synchronization signal, in step 106. Therefore, the UE 1 100 cannot obtain the information on the cellular channel bandwidth configuration. The UE 1 100, located outside of the network service area, configures a fall back channel bandwidth having a pre-defined bandwidth value for D2D communication, in step 107.

Since the BS 102 may determine that the UE 2 101 may perform D2D communication with a UE, such as the UE 1 100, located within an area that is not provided cellular service, as described above, if the UE 1 100 and the UE 2 101 perform D2D communication, the BS 102 may allocate D2D communication resources of the UE 2 101 within the fall back channel bandwidth so as to enable smooth D2D communication between the UE 1 100 and the UE 2 101. For example, the fall back channel bandwidth may be configured as 1.4 MHz corresponding to the smallest channel bandwidth of the LTE system, without being limited thereto in embodiments of the present invention.

When the UE 2 101 wants to receive a D2D service, the UE 2 101 transmits a D2D service request signal to the BS 102, in step 108. In response to the request signal, the BS 102 transmits information relating to D2D synchronization signal configuration and allocation of resources used for the D2D communication to the UE 2 101, in step 109. The transmitted information on the allocation of resources used for D2D communication includes information on communication resources allocated to D2D communication by the BS 102 and information on communication resources used by each of the UEs, including the UE 2 101 within the service area of the BS 102 for transmission of its own discovery signal. Further, the information relating to the D2D synchronization signal configuration includes information on whether to configure the UE 2 101 to transmit a D2D synchronization signal and configuration information on communication resources to be used for transmission of a D2D synchronization signal. The BS 102 determines whether to configure the UE 2 101 to transmit a D2D synchronization signal to the UE 2 101, and the determination does not require a separate report from the UE 2 101.

Upon receiving information relating to D2D synchronization signal configuration and for the D2D resource allocation from the BS 102, in step 109, the UE 2 101 transmits a D2D synchronization signal through a configured resource, in step 110. The UE 1 100 tries to detect the D2D synchronization signal, in step 110, and acquires discovery signal resource configuration information simultaneously with synchronization for execution of D2D communication. The discovery signal resources are configured for the UEs, including the UE 2 101 within the service area of the BS 102, by the BS 102, and the UE 2 101 transmits the discovery signal resource configuration information by including the discovery signal resource configuration information in a D2D synchronization signal. The UE 1 100 can obtain information on configuration of discovery signal transmissible resources from the acquired discovery signal resource configuration information and transmit its own discovery signal through the discovery signal transmissible resources, in step 111. The UE 2 101 also transmits its own discovery signal based on the discovery signal resource configuration information configured by the BS 102. Each of the two UEs 100 and 101 tries to receive discovery signals transmitted from other UEs through resources except for the resource, through which it has transmitted its own discovery signal, among the discovery signal transmissible resources.

Figure 2:
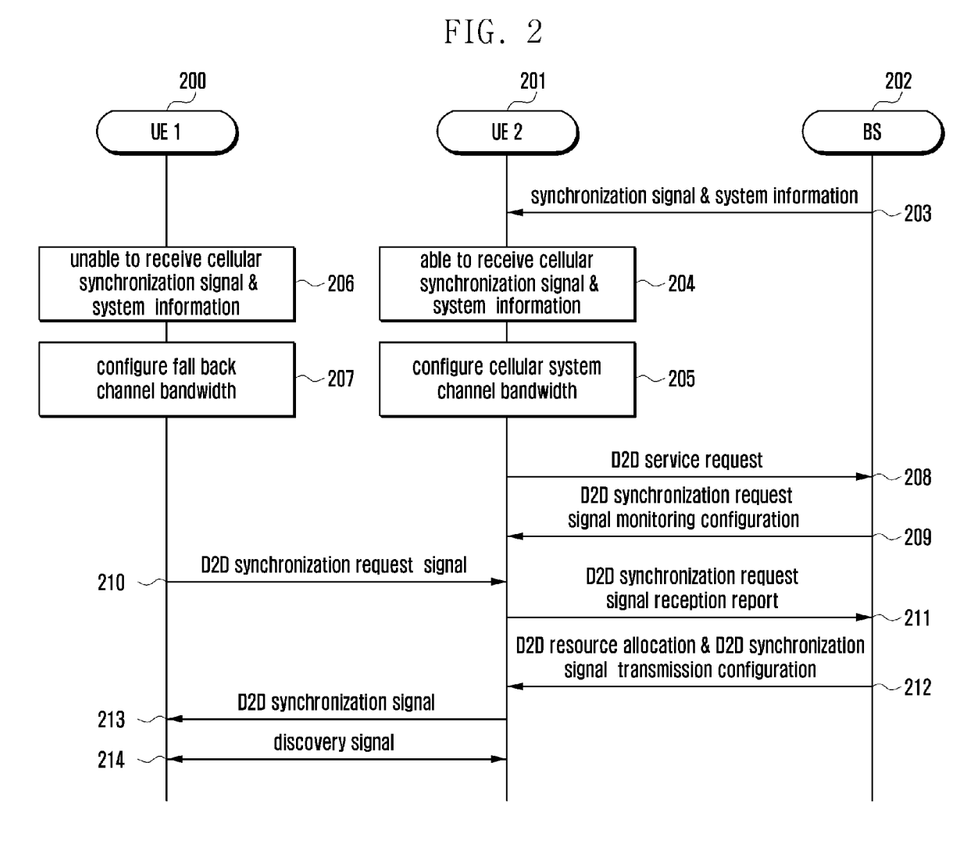
FIG. 2 is a signal flow diagram illustrating transmission and reception of D2D related signals between UEs and base stations in a wireless communication system, according to another embodiment of the present invention.

FIG. 2 is a signal flow diagram illustrating transmission and reception of D2D related signals between UEs and base stations in a wireless communication system, according to another embodiment of the present invention.

Referring to FIG. 2, the assumptions relating to a UE 1 200, a UE 2 201, and a BS 202 and the signal flow from step 203 up to the D2D service request by the UE 2 201, in step 208 are the same as steps 103 through 108 described with respect to FIG. 1. The difference between the embodiments illustrated in FIGS. 1 and 2 lies in that the BS 102 determines the UE transmitting the D2D synchronization signal without a separate report from the UE 2 101 in the case of FIG. 1, while the BS 102 determines the UE transmitting the D2D synchronization signal based on a report received from the UE 2 201 in the case of FIG. 2.

The BS 202 configures a resource by which the UE 2 201, located at a boundary of the service area of the BS 202, can monitor a signal transmitted from UEs, such as the UE 1 200, located within an area that is no longer provided cellular service, in step 209. The signal transmitted from UEs, such as the UE 1 200, is a D2D synchronization request signal, in step 210, which is transmitted through a pre-defined resource and a pre-defined period. The D2D synchronization request signal may be allocated to, and transmitted through, a particular frequency resource.

If the UE 2 201 has succeeded in receiving a D2D synchronization request signal during an interval configured by the BS 202, in step 210, the UE 2 201 transmits a report reporting the reception of the D2D synchronization request signal to the BS 202, in step 211, to notify the BS 202 of the existence of a UE requiring the D2D synchronization signal near the UE 2 201. Based on the report, the BS 202 determines whether to permit the UE 2 201 to transmit a D2D synchronization signal.

Without any report on the reception of the D2D synchronization request signal from the UE 2 201, the BS 202 determines that a UE requiring the D2D synchronization signal does not exist near the UE 2 201, and configures the UE 2 201 to prevent the UE 2 201 from transmitting a D2D synchronization signal. Therefore, the D2D resource allocation and D2D synchronization signal transmission configuration, the D2D synchronization signal transmission, in step 213, and the discovery signal transmission and reception, in step 214 are the same as steps 110 and 111 in FIG. 1.

In the method of determining a UE transmitting a D2D synchronization signal based on a report from the UE by a base station, the transmission is determined when a UE, which is unable to receive a cellular service, exists in an area adjacent to a service area of the base station and needs a D2D synchronization signal. Therefore, the method can reduce the quantity of resources required for the transmission of the D2D synchronization signal and the existing limitation in use of the resources for the cellular UE communication.

Figure 3:
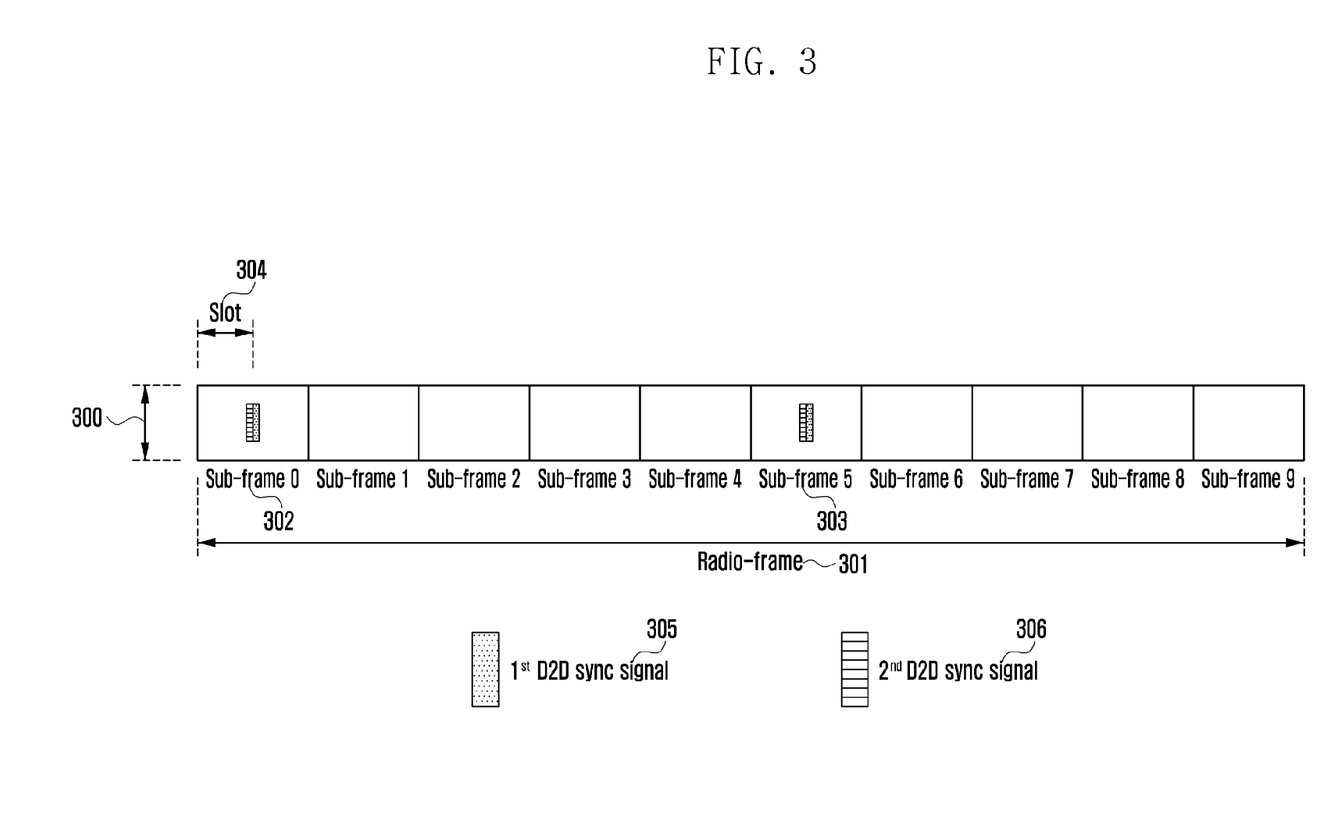
FIG. 3 is a diagram illustrating a D2D synchronization signal design structure in a wireless communication system, according to an embodiment of the present invention.

FIG. 3 is a diagram illustrating a D2D synchronization signal design structure in a wireless communication system, according to an embodiment of the present invention. It is assumed that a UE transmits a D2D synchronization signal in the uplink. However, in embodiments of the present invention, the transmission of the D2D synchronization signal is not limited to the uplink transmission.

Referring to FIG. 3, a D2D synchronization signal is transmitted twice in a radio frame 301 having a temporal length of 10 ms within an uplink channel bandwidth 300 on the frequency axis. The radio frame 301 including the D2D synchronization signal may exist in each radio frame or pre-defined period according to D2D synchronization signal configuration by a base station. The radio frame 301 is configured with 10 sub-frames 302, each of which has a length of 1 ms, and one sub-frame is configured with two slots 304, each of which has a length of 0.5 ms. Further, one slot is configured by seven symbols.

The D2D synchronization signal is transmitted in the final two symbol periods within the first slots of sub-frame 0 302 and sub-frame 5 303. In an embodiment of the present invention, the transmission resource of the D2D synchronization signal is not limited to embodiment of the present invention shown in FIG. 3 and it is possible to use resources of various positions.

The D2D synchronization signal is configured by a first D2D synchronization signal 305 and a second D2D synchronization signal 306, both of which have a sequence-based signal structure. As described above, the D2D synchronization signal is transmitted twice in the radio frame 301. The first D2D synchronization signal 305 is transmitted twice with the same sequence to perform a sub-frame unit synchronization acquisition function, and the second D2D synchronization signal 306 has two short sequences, positions of which on the frequency axis are switched with each other in the first transmission and the second transmission, so that it can acquire synchronization in each radio frame.

The first D2D synchronization signal is configured by a Zadoff-Chu (ZC) sequence generated by selecting one ZC root sequence index among a plurality of ZC root sequence indexes, and the ZC sequence is mapped to the frequency domain. Therefore, if the first D2D synchronization signal is generated by selecting one of M number of ZC root sequence indexes, it is possible to express M types of states by using the first D2D synchronization signal.

Further, the second D2D synchronization signal is generated in a form in which two short sequences are interleaved in the frequency domain. Each of the short sequences is generated in a form in which an m-sequence and a scrambling sequence are multiplied by each other, wherein the m-sequence has a particular cyclic shift value. Therefore, if each of the two short sequences has N number of cyclic shift value combinations, it is possible to express N types of states.

By using the first and second D2D synchronization signals based on the above description, the D2D synchronization signal can indicate discovery signal resource configuration information as in the example shown in Table 1 below. It is assumed that a resource unit for discovery signal transmission and reception is configured by a plurality of consecutive sub-frames, and the consecutive sub-frame resource units exist with a pre-defined cycle. Further, it is assumed that positions of the consecutive sub-frame resource units within a radio frame are always fixed to pre-defined positions except for the sub-frames for transmission of the D2D synchronization signals.

Table 1 below shows an example of discovery signal resource configuration information indication through a D2D synchronization signal.

TABLE 1

| | First D2D synchronization signal (M states) | Second D2D synchronization signal (N states) |
|---|---|---|
| Example 1 | Number of consecutive sub-frames used for discovery signal transmission and reception within a radio frame including sub-frames for discovery signal transmission and reception. | Number of remaining radio frames from a current radio frame to a radio frame including sub-frames for discovery signal transmission and reception. |
| Example 2 | Sub-frame configuration index used for discovery signal transmission and reception. Each configuration includes the following parameters: a period (T_discovery) of radio frame units; an offset (T_offset) of radio frame units in the period; and the number of consecutive sub-frames used for discovery signal transmission and reception within a radio frame including sub-frames for discovery signal transmission and reception. | Current radio frame index (n_radioframe), wherein the index has a value within a range of the period (T_discovery). |

In the case of Example 2 of Table 1 above, when the current radio frame satisfies Equation (1) below, a UE having received a D2D synchronization signal may determine that a resource for discovery signal transmission and reception exists at a pre-defined position within the current radio frame.

$$(n_{radioframe} - T_{offset}) \bmod T_{discovery} = 0 \quad (1)$$

Figure 4:
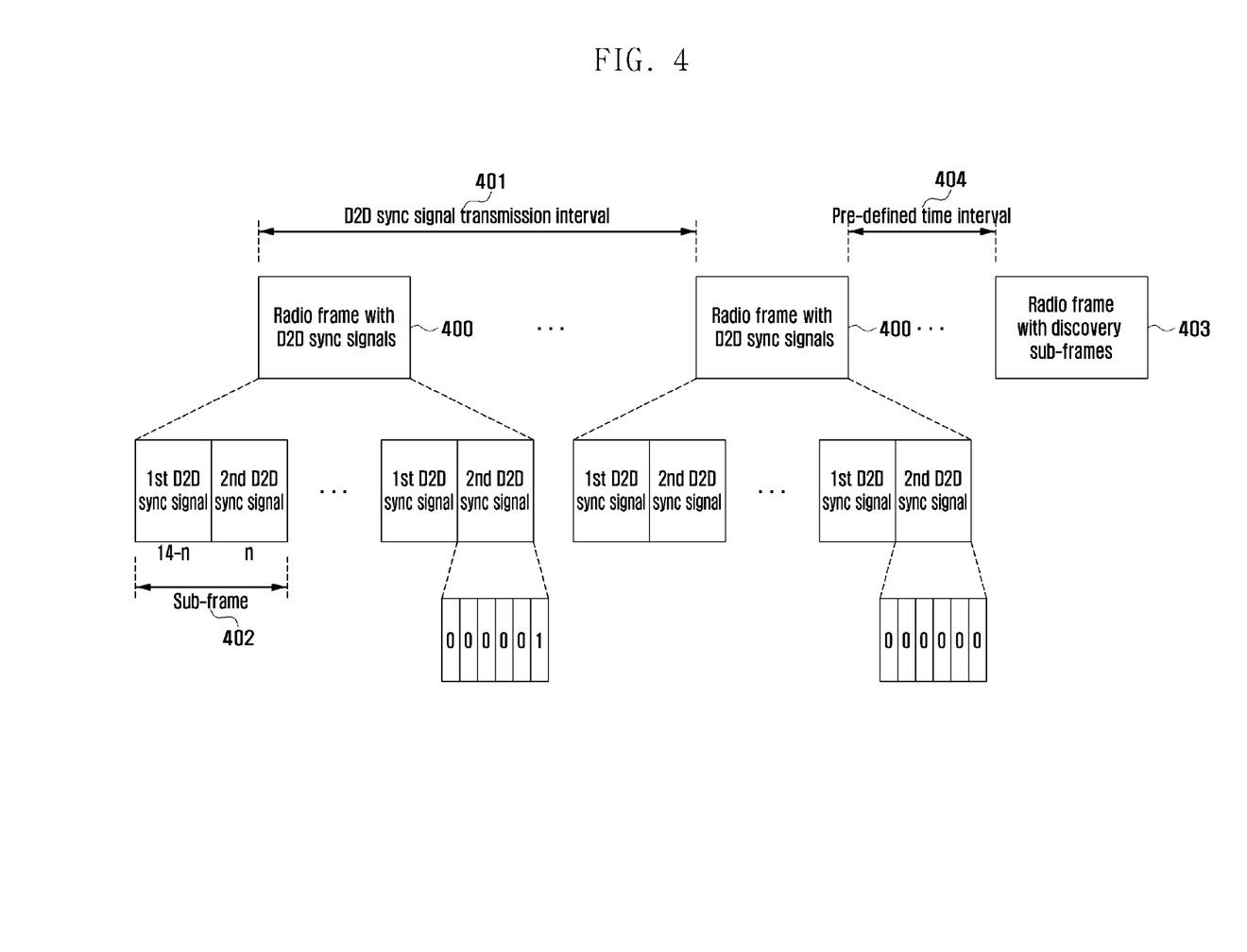
FIG. 4 is a diagram illustrating a D2D synchronization signal design structure in a wireless communication system, according to another embodiment of the present invention.

FIG. 4 is a diagram illustrating a D2D synchronization signal design structure in a wireless communication system, according to another embodiment of the present invention.

Referring to FIG. 4, a radio frame 400 including a D2D synchronization signal exists in each pre-defined D2D synchronization signal transmission interval 401 according to D2D synchronization signal configuration of a base station. A sub-frame 402 including the first and second D2D synchronization signals exists at a particular position within the radio frame 400.

In an embodiment of the present invention, all symbols of the sub-frame 402 are used as resources of the two D2D synchronization signals. Since one sub-frame is configured by 14 symbol time periods, if n number of symbols are used for the second D2D synchronization signal, (14−n) number of symbols can be used for the first D2D synchronization signal. In this event, the first D2D synchronization signal may not include particular information or may include information on the number of consecutive sub-frames for discovery signal transmission and reception similar to that shown in Table 1.

The second D2D synchronization signal includes a total of n sequences existing in a total of n symbols, respectively, in such a manner of one sequence in one symbol. Each of the sequences may have one of two cyclic shift values or can express two states of "0" and "1" by a method using one of the two sequences. Therefore, the second D2D synchronization signal occupying the n symbols can express a total of $2^n$ values. The $2^n$ values can be used as a kind of counter value notifying of the number of radio frames after which a radio frame 403 including sub-frames for discovery signal transmission and reception appears from the current frame.

For example, based on an assumption that the second D2D synchronization signal occupies six symbol intervals, the second D2D synchronization signal included in the first radio frame of FIG. 4 expresses "000001". This notifies that a radio frame including consecutive sub-frames for discovery signal transmission and reception exists after a pre-defined time interval 404 from and after occurrence of one more radio frames including a D2D synchronization signal. Further, the second D2D synchronization signal included in the second radio frame expresses "000000". This notifies that the radio frame 403 including consecutive sub-frames for discovery signal transmission and reception exists after the pre-defined time interval 404 from the current radio frame including a D2D synchronization signal. Therefore, a UE having received a D2D synchronization signal can perform a discovery operation through consecutive sub-frames for discovery signal transmission and reception at a pre-defined position within the corresponding radio frame 403.

This method notifies of discovery signal resource configuration information through a D2D synchronization signal, while simultaneously allocating a plurality of symbols to the first and second D2D synchronization signals to thereby guarantee the D2D synchronization acquisition performance.

Figure 5:
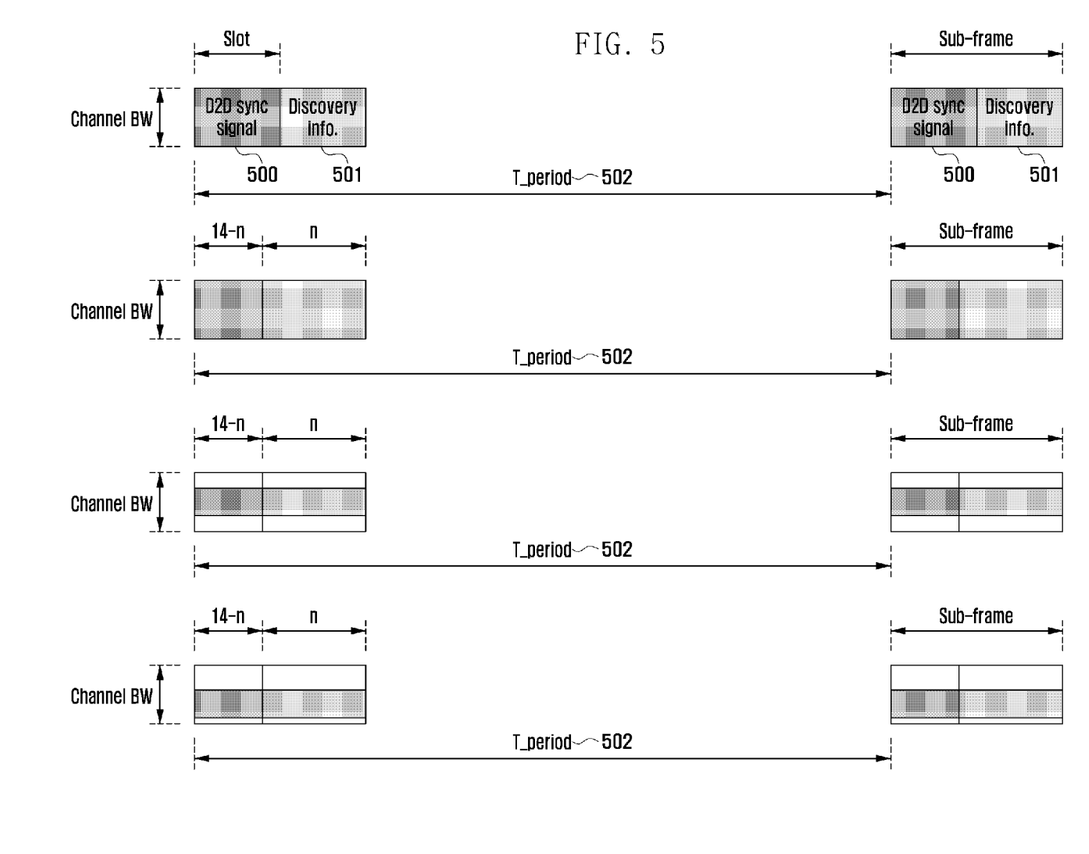
FIG. 5 is a diagram illustrating a D2D synchronization signal design structure in a wireless communication system, according to another embodiment of the present invention.

FIG. 5 is a diagram illustrating a D2D synchronization signal design structure in a wireless communication system, according to another embodiment of the present invention.

Referring to FIG. 5, discovery signal resource configuration information 501 is transmitted at a pre-defined position corresponding to the position of a D2D synchronization signal 500.

This embodiment of the present invention is based on an assumption that the D2D synchronization signal 500 and a part of the discovery signal resource configuration information 501 are transmitted together in one sub-frame, and the other part of the discovery signal resource configuration information 501 is located at symbols directly after the symbols through which the D2D synchronization signal 500 is transmitted. However, the position of the discovery signal resource configuration information 501 is not limited to the position described above, and may be selected from various positions corresponding to the D2D synchronization signal 500 for the other part of the discovery signal resource configuration information 501.

The D2D synchronization signal 500 is configured by a first D2D synchronization signal and a second D2D synchronization signal, and a part of the symbols allocated to the D2D synchronization signal 500 is used for the first D2D synchronization signal and the other part is used for the second D2D synchronization signal.

The D2D synchronization signal 500 notifies of a part of discovery signal resource configuration related information and notifies of information on the resource position at which the other part of the discovery signal resource configuration information 501 is transmitted.

For example, the D2D synchronization signal 500 notifies a period of radio frame units by which sub-frames used for discovery signal transmission and reception are generated, and the other of the discovery signal resource configuration information 501 is included in the symbols directly after the symbols through which the D2D synchronization signal 500 is transmitted.

The other related information may include the number of consecutive sub-frames used for discovery signal transmission and reception within a radio frame including sub-frames for discovery signal transmission and reception within the period mentioned above. Here, T_period 502 indicates a D2D synchronization signal transmission period configured by a base station. The D2D synchronization signal and discovery signal resource configuration information may be allocated to various positions on frequency/time resources as in the examples shown in FIG. 5.

Figure 6:
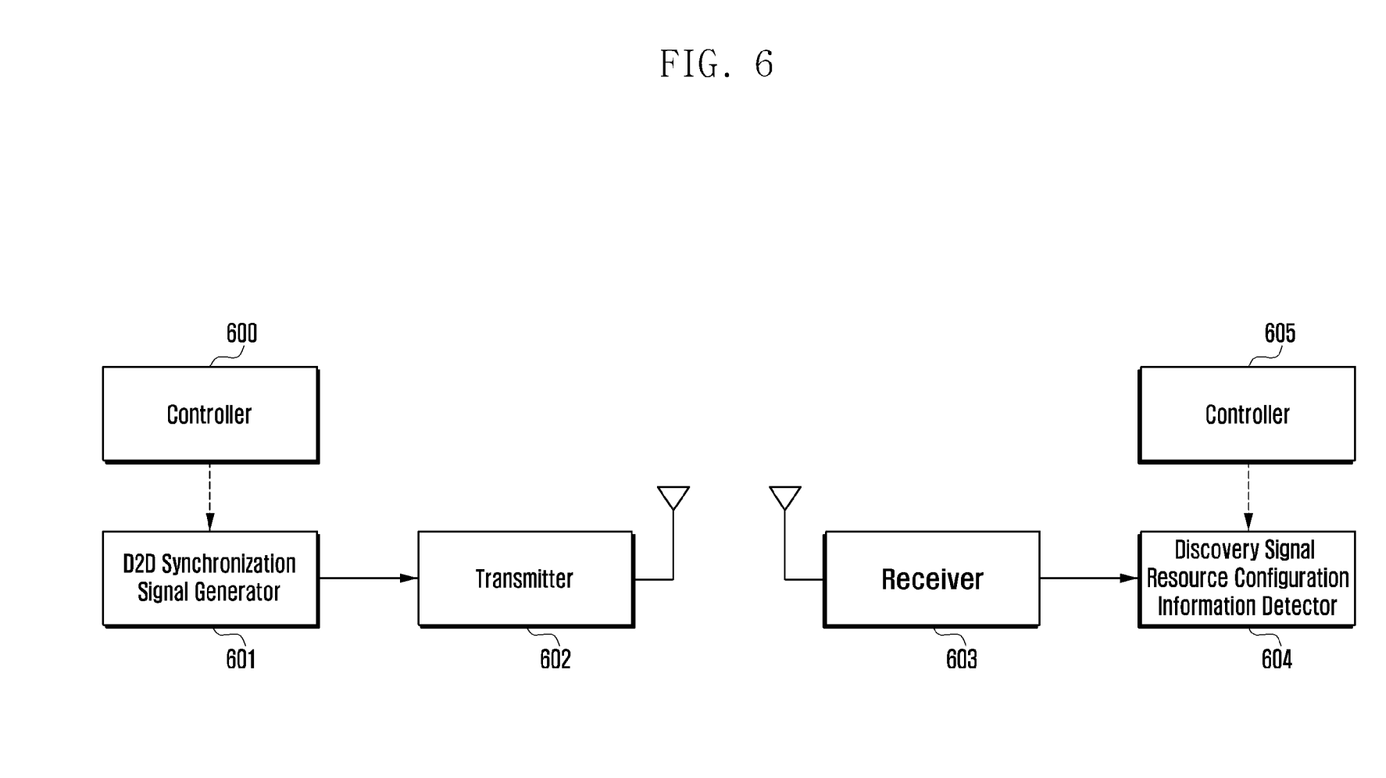
FIG. 6 is a block diagram illustrating a D2D synchronization signal transmitting side and a D2D synchronization signal receiving side of a UE, according to an embodiment of the present invention.

FIG. 6 is a block diagram illustrating a D2D synchronization signal transmitting side and a D2D synchronization signal receiving side of a UE in a wireless communication system, according to an embodiment of the present invention.

Referring to FIG. 6, a controller 600 of the transmitting side controls generation of a D2D synchronization signal based on one of discovery signal resource configuration information indication methods using a D2D synchronization signal and D2D synchronization signal transmission configuration made by a base station, according to embodiments of the present invention described above. Further, a D2D synchronization signal generator 601 generates proper D2D synchronization signal sequences corresponding to current discovery signal resource configuration by the controller 600. A transmitter 602, which may also be referred to as a transmission unit or a communication unit, maps the D2D synchronization signal to time/frequency resources for the D2D synchronization signal and transmits the mapped D2D synchronization signal.

A receiver 603, which may also be referred to as a transceiver, a communication unit, or a D2D synchronization signal detector, of the receiving side detects a D2D synchronization signal from a signal received from the transmitting side. The detected D2D synchronization signal is input to a discovery signal resource configuration information detector 604, which, under the control of a controller 605, analyzes a discovery signal resource position according to one of the discovery signal resource configuration information indication methods using a D2D synchronization signal, according to embodiments of the present invention described above.

In embodiments of the present invention, the operations of the D2D synchronization signal generator 601 and the discovery signal resource configuration information detector 604 may be performed by the controller 600 of the transmitting side and the controller 605 of the receiving side, respectively.

Further, in a wireless communication system, according to an embodiment of the present invention, a base station may include a communication unit and a controller, similar to a D2D synchronization signal transmitting side and a D2D synchronization signal receiving side of a UE. The controller of the base station may perform a control to receive a request for a D2D communication service from a UE and transmit D2D communication-related information to the UE.

Further, the controller may configure D2D communication synchronization request signal monitoring for a UE, and may control a communication unit to transmit D2D communication related information, in response to a report of D2D communication synchronization request from the UE.

Software components including instructions or code for performing the methodologies described herein may be stored in one or more of associated memory devices (e.g., Read Only Memory (ROM), fixed or removable memory) and, when ready to be utilized, loaded in part or in whole (e.g., into Random Access Memory (RAM)) and executed by a Central Processing Unit (CPU) or controller.

The information transfer method using a D2D synchronization signal as described above can be used to transmit another type of information as well as the discovery signal resource configuration information. For example, the method may be used in order to notify of a reference signal position, a Modulation and Coding Scheme (MCS), an ID of a UE transmitting a D2D synchronization signal, a type of a discovery signal, and a frequency position of a discovery signal.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method of performing device-to-device communication by a terminal, the method comprising the steps of:
   receiving, at the terminal, information relating to the device-to-device communication from a base station, the information relating to the device-to-device communication including information relating to discovery signal resource configuration information and information for allocating a resource on discovery signal resource configuration information;
   transmitting the discovery signal resource configuration information, from the terminal, to another terminal, which does not receive the information relating to the device-to-device communication from the base station, based on the information relating to the device-to-device communication; and
   after the discovery signal resource configuration information is transmitted, transmitting, at the terminal, a discovery signal associated with information on the terminal to the another terminal, using at least one resource identified based on the discovery signal resource configuration information.

2. The method of claim 1, wherein the information relating to the device-to-device communication further comprises at least one of information on a communication resource allocated for the device-to-device communication, information on the discovery signal, and information on whether the terminal should transmit the discovery signal resource configuration information.

3. The method of claim 1, wherein transmitting the discovery signal resource configuration information includes further transmitting at least one of:
frequency information of the discovery signal, type information of the discovery signal, an identifier of the terminal transmitting the discovery signal resource configuration information, a modulation and coding scheme (MCS), and information on a reference signal.

4. The method of claim 1, wherein the discovery signal resource configuration information is included in a synchronization signal, and
wherein the synchronization signal further includes a first synchronization signal and a second synchronization signal, the first synchronization signal comprises information on a sub-frame resource usable for transmission and reception of the discovery signal, and the second synchronization signal comprises information on a relation between a current radio frame and a next radio frame including the discovery signal resource configuration information.

5. The method of claim 1, wherein the discovery signal resource configuration information is included in a synchronization signal, and
wherein the synchronization signal further includes a first synchronization signal and a second synchronization signal, the first synchronization signal comprises a period of a radio frame including the discovery signal resource configuration information, an offset of the radio frame within the period, and a sub-frame resource usable for transmission and reception of the discovery signal within the radio frame, and the second synchronization signal comprises information on an index of a current radio frame.

6. The method of claim 1, wherein the discovery signal resource configuration information is included in all radio frames or one or more select radio frames according to a pre-defined period, and wherein, within a radio frame having the discovery signal resource configuration information, the discovery signal resource configuration information is included in a part or all of symbol intervals of at least one sub-frame.

7. The method of claim 1, further comprising:
monitoring a device-to-device communication synchronization request signal, the monitoring being configured by the information relating to device-to-device communication from the base station; and
upon receiving the device-to-device communication synchronization request signal from the another terminal, reporting the device-to-device communication synchronization request to the base station.

8. A method of performing device-to-device communication by a terminal, the method comprising the steps of:
receiving, at the terminal, which does not receive information relating to the device to device communication from a base station, discovery signal resource configuration information from another terminal, which does receive the information relating to the device-to-device communication from the base station, and the information relating to the device-to-device communication includes information relating to discovery signal resource configuration information and information for allocating a resource on the discovery signal resource configuration information; and
after the discovery signal resource configuration information is received, receiving, at the terminal, a discovery signal associated with information on the another terminal from the another terminal, using at least one resource identified based on the discovery signal resource configuration information.

9. The method of claim 8, wherein receiving the discovery signal resource configuration information includes further receiving at least one of:
frequency information of the discovery signal, type information of the discovery signal, an identifier of the terminal transmitting the discovery signal resource configuration information, a modulation and coding scheme (MCS), and information on a reference signal.

10. The method of claim 8, further comprising transmitting a device-to-device synchronization request signal for requesting a synchronization signal, from the terminal to the another terminal,
wherein the discovery signal resource configuration information is included in the synchronization signal.

11. A method of performing device-to-device communication by a base station in communication with a terminal, the method comprising the steps of:
receiving, by the base station, a device-to-device communication service request from the terminal; and
transmitting information relating to the device-to-device communication, from the base station, to the terminal,
wherein the information relating to the device-to-device communication includes information relating to discovery signal resource configuration information and information for allocating a resource on discovery signal resource configuration information,
wherein the discovery signal resource configuration information is transmitted by the terminal to the another terminal, which does not receive the information relating to the device-to-device communication from the base station, and
wherein a discovery signal, which is associated with information on the terminal, is transmitted by the terminal to the another terminal using at least one resource identified based on the discovery signal resource configuration information, after the discovery signal resource configuration information is transmitted.

12. The method of claim 11, wherein transmitting the information relating to the device-to-device communication comprises:
configuring monitoring of a device-to-device communication synchronization request signal and a resource for the monitoring for the terminal, in order to determine whether it is necessary to transmit a synchronization signal; and
upon receiving a report of detection of the device-to-device communication synchronization request from the terminal, transmitting the information relating to the device-to-device communication,
wherein the discovery signal resource configuration information is included in the synchronization signal.

13. A terminal for performing device-to-device communication, the terminal comprising:
a communication unit configured to transmit and receive a signal; and
a controller configured to control the communication unit to:
receive information relating to the device-to-device communication from a base station, the information relating to the device-to-device communication including information relating to discovery signal resource configuration information and information for allocating a resource on discovery signal resource configuration information, transmit the discovery signal resource configuration information to another terminal, which does not receive the information relating to the device-to-device communication from the base station, based on the information relating to the device-to-device communication, and transmit a discovery signal associated with information on the terminal to the another terminal using at least one resource identified based on the discovery signal resource configuration information, after the discovery signal resource configuration information is transmitted.

14. The terminal of claim 13, wherein the information relating to the device-to-device communication further comprises at least one of information on a communication resource allocated for the device-to-device communication, information on the discovery signal, and information on whether the terminal should transmit the discovery signal resource configuration information.

15. The terminal of claim 13, wherein transmitting the discovery signal resource configuration information includes further transmitting at least one of:
frequency information of the discovery signal, type information of the discovery signal, an identifier of the terminal transmitting the discovery signal resource configuration information, a modulation and coding scheme (MCS), and information on a reference signal.

16. The terminal of claim 13, wherein the discovery signal resource configuration information included in a synchronization signal, and
wherein the controller configures the synchronization signal to further include a first synchronization signal and a second synchronization signal, the first synchronization signal comprising information on a sub-frame resource usable for transmission and reception of the discovery signal, and the second synchronization signal comprising information on a relation between a current radio frame and a next radio frame including the discovery signal resource configuration information.

17. The terminal of claim 13, wherein the discovery signal resource configuration information is included in a synchronization signal, and
wherein the controller configures the synchronization signal to further include a first synchronization signal and a second synchronization signal, the first synchronization signal comprising a period of a radio frame including the discovery signal resource configuration information, an offset of the radio frame within the period, and a sub-frame resource usable for transmission and reception of the discovery signal within the radio frame, and the second synchronization signal comprising information on an index of a current radio frame.

18. The terminal of claim 13, wherein the controller is further configured to include the discovery signal resource configuration information in all radio frames or in one or more select radio frames according to a pre-defined period, and, within a radio frame having the discovery signal resource configuration information, the discovery signal resource configuration information is included in a part or all of symbol intervals of at least one sub-frame.

19. The terminal of claim 13, wherein the controller is further configured to control the communication unit to monitor a device-to-device communication synchronization request signal, the monitoring being configured by the information relating to device-to-device communication from the base station, and upon receiving the device-to-device communication synchronization request signal from the another terminal, to report the device-to-device communication synchronization request to the base station.

20. A terminal for performing device-to-device communication, the terminal comprising:
a communication unit configured to transmit and receive signals; and
a controller configured to control the communication unit to:
receive, at the terminal, which does not receive information relating to the device-to-device communication from a base station, discovery signal resource configuration information from another terminal, which does receive the information relating to the device-to-device communication from the base station, the information relating to the device-to-device communication including information relating to discovery signal resource configuration information and information for allocating a resource on the discovery signal resource configuration information, and
receive a discovery signal associated with information on the another terminal from the another terminal using at least one resource identified based on the discovery signal resource configuration information after the discovery signal resource configuration information is received.

21. The terminal of claim 20, wherein the controller is further configured to control the communication unit to transmit a device-to-device synchronization request signal for requesting a synchronization signal, to the another terminal, and
wherein the discovery signal resource configuration information is included in the synchronization signal.

22. A base station comprising:
a communication unit configured to transmit and receive signals; and
a controller configured to control the communication unit to receive a device-to-device communication service request from a terminal and transmit information relating to the device-to-device communication to the terminal,
wherein the information relating to the device-to-device communication includes information relating to discovery signal resource configuration information and information for allocating a resource on discovery signal resource configuration information,
wherein the discovery signal resource configuration information is transmitted by the terminal to the another terminal, which does not receive the information relating to the device-to-device communication from the base station, and
wherein a discovery signal, which is associated with information on the terminal, is transmitted by the terminal to the another terminal using at least one resource identified based on the discovery signal resource configuration information, after the discovery signal resource configuration information is transmitted.

23. The base station of claim 22, wherein the controller configures monitoring of a device-to-device communication synchronization request signal and a resource for the monitoring for the terminal, in order to determine whether it is necessary to transmit a synchronization signal, and upon receiving a report of detection of the device-to-device communication synchronization request from the terminal, transmits the information relating to the device-to-device communication, wherein the discovery signal resource configuration information is included in the synchronization signal.

* * * * *